United States Patent
Xu

(10) Patent No.: US 12,322,289 B2
(45) Date of Patent: Jun. 3, 2025

(54) METHOD AND SYSTEM OF SPECIAL VEHICLE NOTIFICATION IN HD MAP TO IMPROVE AV DRIVING SAFETY

(71) Applicant: HERE Global B.V., Eindhoven (NL)

(72) Inventor: Jingwei Xu, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 256 days.

(21) Appl. No.: 18/087,522

(22) Filed: Dec. 22, 2022

(65) Prior Publication Data

US 2024/0212496 A1   Jun. 27, 2024

(51) Int. Cl.
| | |
|---|---|
| G08G 1/0967 | (2006.01) |
| B60W 50/14 | (2020.01) |
| B60W 60/00 | (2020.01) |
| G06N 3/088 | (2023.01) |
| G06N 3/09 | (2023.01) |
| H04L 67/10 | (2022.01) |

(52) U.S. Cl.
CPC ....... *G08G 1/096775* (2013.01); *B60W 50/14* (2013.01); *B60W 60/0053* (2020.02); *G06N 3/088* (2013.01); *G06N 3/09* (2023.01); *G08G 1/096708* (2013.01); *H04L 67/10* (2013.01); *B60W 2420/403* (2013.01); *B60W 2420/408* (2024.01); *B60W 2554/402* (2020.02); *B60W 2556/45* (2020.02)

(58) Field of Classification Search
None
See application file for complete search history.

(56) References Cited

U.S. PATENT DOCUMENTS

| | | | |
|---|---|---|---|
| 7,720,580 B2 | 5/2010 | Higgins-luthman | |
| 8,352,112 B2 | 1/2013 | Mudalige | |
| 8,700,251 B1 | 4/2014 | Zhu et al. | |
| 9,688,288 B1 | 6/2017 | Lathrop et al. | |
| 9,805,601 B1* | 10/2017 | Fields | G06V 20/58 |
| 2019/0351916 A1* | 11/2019 | Mangal | B60W 50/14 |
| 2019/0391582 A1* | 12/2019 | Jung | B60Q 1/525 |
| 2020/0020227 A1* | 1/2020 | Ran | G08G 1/075 |

(Continued)

FOREIGN PATENT DOCUMENTS

| | | | | | |
|---|---|---|---|---|---|
| CN | 106553655 A | * | 4/2017 | ........ | B60W 30/0956 |
| CN | 110718064 A | * | 1/2020 | ............ | G06F 18/24 |

(Continued)

OTHER PUBLICATIONS

Machine translation of CN-106553655-A (Year: 2017).*

(Continued)

*Primary Examiner* — Hussein Elchanti
*Assistant Examiner* — Kenneth M Dunne
(74) *Attorney, Agent, or Firm* — Lempia Summerfield Katz LLC

(57) ABSTRACT

System and methods for systems for special vehicle detection and notifications. Connected vehicle probe and sensor data is acquired and processed to detect the presence of a special vehicle using one or more machine learning models. Attributes are determined for the special vehicle based on additional information. An informational message/notification is composed and sent to vehicles in the vicinity of the special vehicle. Warnings may be provided for how to maneuver vehicles around the special vehicle.

17 Claims, 8 Drawing Sheets

(56) References Cited

U.S. PATENT DOCUMENTS

| | | | | |
|---|---|---|---|---|
| 2021/0094583 A1* | 4/2021 | Choi | ................. | B60W 60/0053 |
| 2021/0122398 A1* | 4/2021 | Kim | .................... | B60W 60/005 |
| 2021/0316764 A1* | 10/2021 | Jung | ...................... | G05D 1/227 |
| 2021/0347371 A1* | 11/2021 | Lee | .................. | B60W 60/0053 |
| 2021/0380143 A1* | 12/2021 | Alvarez | ................ | B60W 50/14 |
| 2022/0126864 A1* | 4/2022 | Moustafa | .............. | G06T 1/0007 |
| 2022/0230537 A1* | 7/2022 | Whyte | .................... | H04W 4/40 |

FOREIGN PATENT DOCUMENTS

| | | | | | |
|---|---|---|---|---|---|
| CN | 113335301 A | * | 9/2021 | ............. | B60K 35/10 |
| GB | 2579021 A | * | 6/2020 | ........ | B60W 30/0956 |

OTHER PUBLICATIONS

Machine translation of CN-113335301-A (Year: 2021).*
Machine translation of CN-110718064-A (Year: 2020).*
Coifman, Benjamin, et al. "A real-time computer vision system for vehicle tracking and traffic surveillance." Transportation Research Part C: Emerging Technologies 6.4 (1998): 271-288.

* cited by examiner

METHOD AND SYSTEM OF SPECIAL VEHICLE NOTIFICATION IN HD MAP TO IMPROVE AV DRIVING SAFETY

FIELD

The following disclosure relates to navigation devices or services.

BACKGROUND

Location service providers are capable of collecting sensor data from connected vehicles and aggregating the collected sensor data to build high definition (HD) maps with the road segment resolution of centimeter level. The HD maps and additional information provided by the location service providers support, among other navigation applications, the implementation of Advanced Driver Assistance Systems (ADAS) for autonomous driving vehicles. The sensor data collected from connected vehicles include camera, lidar, radar, geolocation, ultrasonic sensors, and other in vehicle sensors. ADAS dynamic content services may include real time traffic, hazard warning, road signs, safety cameras, on-street parking, . . . etc.

One challenge for providers is recognizing from the sensor data and generating instructions for special and unique scenarios on the roadway. Special scenarios may include low probability event or unique objects that a vehicle encounters on the roadway. Special vehicles, in particular, may lead to such a special scenario. Special vehicles may include non-standard vehicles such as oversized loads and other vehicles that require special operating procedures.

As an example of a special vehicle, an oversize load (or overweight load) is a load that exceeds the standard or ordinary legal size and/or weight limits for a truck/vehicle to convey on a specified portion of road, highway, or other transport infrastructure, such as air freight or water freight. Oversized loads may also be referred to as special transport or heavy and oversized transportation. There may also be load-per-axle limits. However, a load that exceeds the per-axle limits but not the overall weight limits may be considered overweight. Examples of oversize/overweight loads may include but are not limited to construction machines (cranes, front loaders, backhoes, etc.), pre-built homes, containers, and construction elements (bridge beams, generators, windmill propellers, rocket stages, and industrial equipment). Due to the size, weight, or load of these special vehicles, there are special operating rules for the special vehicle and other vehicles operating in the vicinity of the special vehicle.

Special vehicles such as oversized loads may be rarely seen and thus may provide a special scenario for an autonomous or highly assisted vehicles. There exists a need for a navigation system that can recognize and provide instructions for interacting with the special vehicles on the roadway.

SUMMARY

In an embodiment, a system for special vehicle notification is provided. The system includes one or more connected devices, one or more machine learning models, and a location cloud platform. The one or more connected devices are configured to acquire sensor data of a special vehicle. The one or more machine learning models are configured to detect the special vehicle in the sensor data. The location cloud platform is configured to acquire special vehicle data from one or more sources including at least the one or more machine learning models. The location cloud platform is configured to generate a warning message concerning operation in the vicinity of the special vehicle and distribute the warning message to one or more connected vehicles.

In an embodiment, a method for special vehicle notification is provided, the method including acquiring sensor data of one or more objects on a roadway; detecting a special vehicle on the roadway at a lane level resolution using the sensor data; determining attributes of the special vehicle; generating a special vehicle information package based on the attributes and a location of the special vehicle; and generating and transmitting warning messages based on the special vehicle information package to one or more connected vehicles within a certain distance of the special vehicle.

In an embodiment, a computer-readable, non-transitory medium storing a program is provided that causes a computer to execute a method comprising: detecting a special vehicle driving on a roadway at a lane level resolution using a special vehicle detection machine learning system; acquiring third party special vehicle driving data for the detected special vehicle generating driving guidance message based on the third-party special vehicle driving data; and transmitting the driving guidance message to other vehicles in a vicinity of the special vehicle.

BRIEF DESCRIPTION OF THE DRAWINGS

Exemplary embodiments of the present invention are described herein with reference to the following drawings.

DETAILED DESCRIPTION

Figure 1:
FIG. 1 depicts examples of special vehicles.
Figure 1:
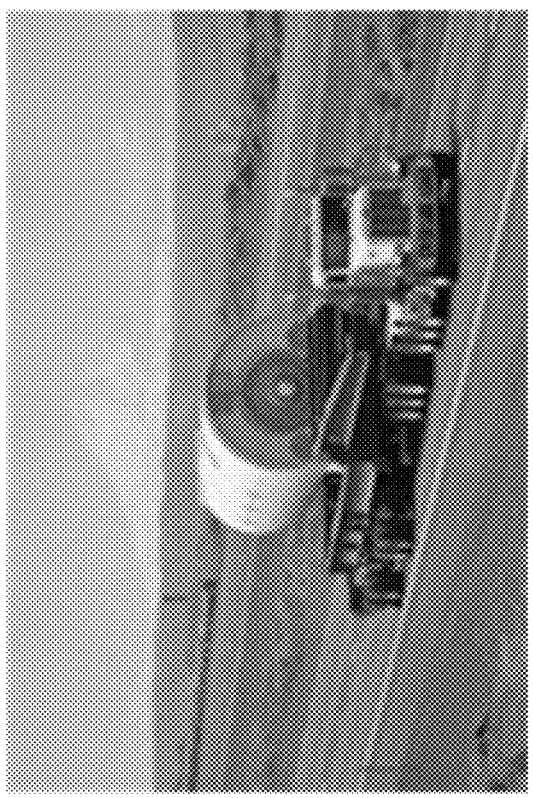
Figure 1:
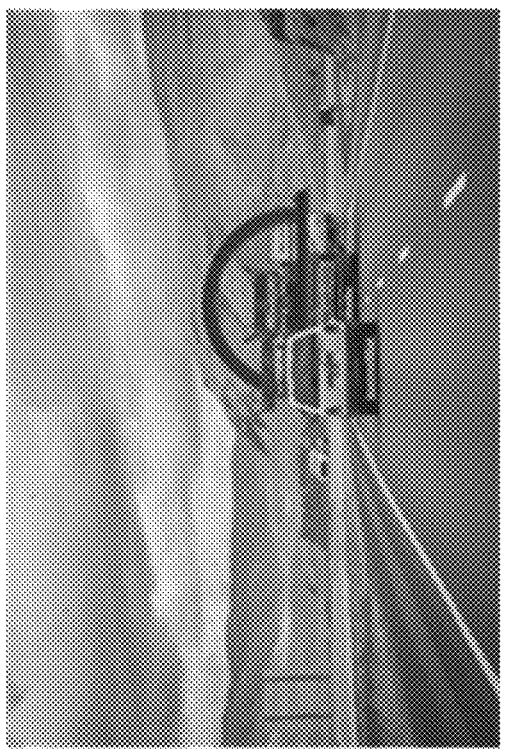

Embodiments provide systems and methods for special vehicle detection and notifications. Connected vehicle probe and sensor data is acquired and processed to detect the presence of a special vehicle. Once the special vehicle has been detected, lane level map matching may be applied to determine its location and to start tracking its position continuously. Attributes are determined for the special vehicle such as its location, width, vehicle length, size, how many lanes it occupies, load, brake distance or geo defense distance, OD information, etc. An informational message/notification is composed and sent to vehicles in the vicinity of the special vehicle. Warnings may be provided for how to maneuver vehicles around the special vehicle. As an example, a disengage AV operation decision may be implemented, for example for dangerous or poisonous material load vehicles in clement weathers or reduced visibility situations.

This disclosure relates to different kinds of special vehicles (construction equipment vehicles, oversize load vehicles, chemical transportation vehicles . . . etc.), information aggregation, tracking, warning notification, geofence, ingestion backend pipeline as dynamic content along with HD map content to deliver to on field vehicles including autonomous vehicles equipped v2v communication, and wireless communication modules to support autonomous driving road safety by preventing or mitigating any potential vehicles collisions.

The systems and methods described herein are applicable to navigation systems and vehicles in general, but more specifically navigation systems that support fully highly assisted, autonomous, or semi-autonomous vehicles. A highly assisted driving (HAD) vehicle may refer to a vehicle that does not completely replace the human operator. Instead, in a highly assisted driving mode, the vehicle may perform some driving functions and the human operator may perform some driving functions. Vehicles may also be driven in a manual mode in which the human operator exercises a degree of control over the movement of the vehicle. The vehicles may also include a completely driverless mode. Other levels of automation are possible. The HAD vehicle may control the vehicle through steering or braking in response to the position of the vehicle and routing instructions. Advanced driver-assistance system (ADAS) vehicles include one or more partially automated systems in which the vehicle alerts the driver. The features may be used to provide alerts to the operator regarding upcoming features. ADAS vehicles may include adaptive cruise control, automated braking, or steering adjustments to keep the driver in the correct lane. ADAS vehicles may issue warnings for the driver based on the position of the vehicle either on a roadway or within a road network system. There are five typical levels of autonomous driving. For level 0, the driver completely controls the vehicle at all times. For level 1, individual vehicle controls are automated, such as electronic stability control or automatic braking. For level 2, at least two controls can be automated in unison, such as adaptive cruise control in combination with lane-keeping. For level 3 the driver can fully cede control of all safety-critical functions in certain conditions. The car senses when conditions require the driver to retake control and provides a "sufficiently comfortable transition time" for the driver to do so. For level 4, the vehicle performs all safety-critical functions for the entire trip, with the driver not expected to control the vehicle at any time. For level 5, the vehicle includes humans only as passengers, no human interaction is needed or possible. Vehicles classified under Levels 4 and 5 of autonomy are considered highly and fully autonomous respectively as they can engage in all the driving tasks without human intervention One challenge with operating HAD, ADAS, and autonomous vehicles is recognizing and reacting to unique and rare scenarios on the roadway. One such rare scenario includes detecting and safely operating around special vehicles. Special vehicles may include such vehicles as oversize load vehicles, chemical vehicles, construction vehicles . . . etc. that have special rules and regulations when operating on the roadway. As an example, some oversize load vehicles need front escort vehicle and/or back escort vehicles to protect or warning other vehicles driving around. Some special vehicles may occupy multiple lanes while driving on the road which may cause traffic problem or driving safety issue due to different barking distances. Some special vehicles may have warning signs, warning flags, warning lights equipped to remind other vehicles around for the safety risks. However, in situations like late afternoon or night driving, inclement weather, as fog or rain reducing visibility, safety may still be a big concern.

FIG. 1 depicts an example of special vehicles on the road. The special vehicles include oversize load vehicles, chemical vehicles, construction vehicle . . . etc., which need the special rule and regulations driving on highway or arterial road. A special vehicle may be defined as any vehicle that requires special operation on the roadway. One example may include oversized load vehicles that exceed the maximum legal weight or dimensions. Every location may have different legal limits. Federal guidelines for the United States are as follows: length: maximum of 75' from front of truck to the end of the load; width: maximum of 8'6"; height: maximum of 13'6" from ground to top of load; weight: 80,000 lbs. including truck, trailer, and cargo. Any vehicle that exceeds these maximums may require special operating procedures and may be considered a special vehicle. In general, special vehicles have warning signs, flags, lights to remind other vehicles around for the safety risks as the special vehicles may have different braking distances and maneuverability in different situations. In an example, special vehicles may display an operable oscillating, rotating, or flashing amber light(s) when moving under oversize/overweight permit authority. Special vehicles may require escort vehicles that include their own rules and regulations for operating on a roadway. For example, one civilian escort may be required for all moves that 1) exceed 14' 6" wide, or 2) exceed 14' 6" high, or 3) exceed 110' long. Two civilian escorts may be required, one in front of the load and one behind, for all moves that have a combination of two or more of the following dimensions: 1) exceed 14' 6" wide, or 2) exceed 14' 6" high, or 3) exceed 110' long. Three civilian escorts may be required for all moves that 1) exceed 16' 0" wide, or 2) exceed 18' 0" high, or 3) exceed 145' long. Police escorts may be required for all moves that 1) exceed 18' 0" wide, or 2) exceed 18' 0" high, or 3) exceed 200' long, or 4) when deemed necessary after a bridge analysis or district investigation are completed and must be set up at least 24 working hours before moving. Movements of objects over 80' in length may be required to be equipped with two operating flashing amber lights—one over the cab of the vehicle; the other within 10' 0" of the rear of the object, mounted as high as practicable over it. Oversize load signs may be mandatory on the front and rear of vehicles for loads over 10' 0" wide, or 14' 6" high, or 75' long.

The presence of a special vehicle requires an AV's perception system to fully understand the surrounding situations and take proper driving actions, for example by avoiding switching lanes or attempting to pass. For map, traffic, and dynamic content service providers, it is challenging to detect in real-time and deliver special vehicle information and warning messages to on field vehicles including autonomous vehicles with minimum latency.

The following embodiments relate to several technological fields including but not limited to navigation, autonomous driving, assisted driving, traffic applications, and other location-based systems. The following embodiments achieve advantages in each of these technologies because an increase in the accuracy of the identification of dangerous conditions improves the effectiveness, efficiency, and speed of specific application in these technologies. In each of the technologies of navigation, autonomous driving, assisted driving, traffic applications, and other location-based systems, improved identification of special vehicles improves the technical performance of the application. In addition, users of navigation, autonomous driving, assisted driving, traffic applications, and other location-based systems are more willing to adopt these systems given the technological advances in detection of special vehicles.

Figure 2:
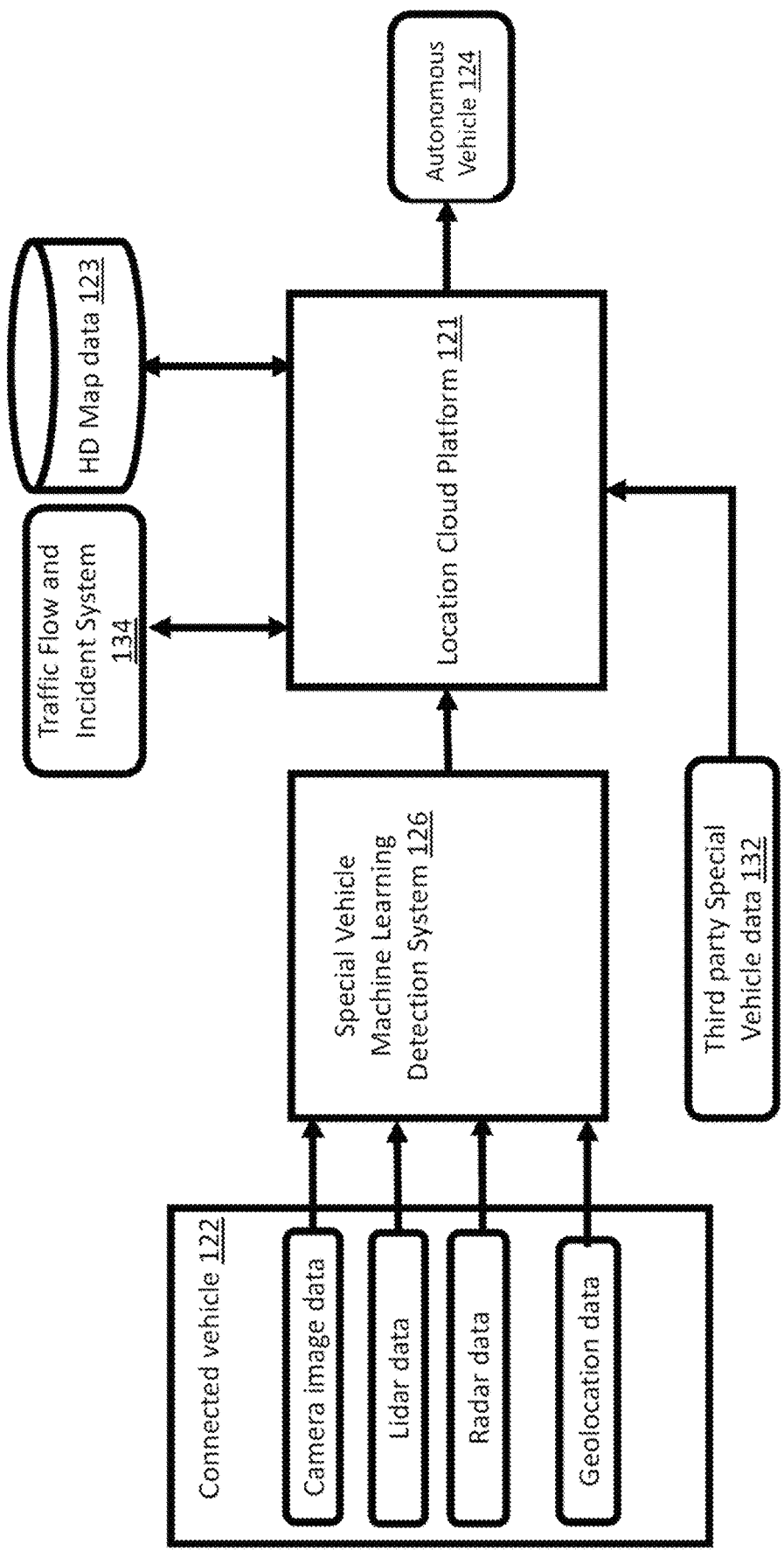
FIG. 2 depicts an example system for special vehicle notification according to an embodiment.

FIG. 2 illustrates an example system for detection of special vehicles and generation of special vehicle information. The system includes one or more connected vehicles 122 (also referred to as connected devices 122), a special vehicle machine learning detection system 126, a location cloud platform 121, a third-party special vehicle datastore 132, a traffic flow and incident system 134, an HD map database, and an autonomous vehicle 124. The one or more connected vehicles 122 are configured to acquire data using one or more sensors. A special vehicle machine learning detection system 126 is configured to detect the presence of a special vehicle using the data from the one or more sensors, such as the camera image data, Lidar data, Radar data, or geolocation data. The location cloud platform 121 may include or access data from different sources including the one or more connected devices 122, a third-party special vehicle database, a traffic flow and incident system, and/or HD map data from a geographic database 123 or map database. The location cloud platform 121 communicates with these data sources using a network. The location cloud platform 121 is configured to generate notifications, warnings, or instructions for an autonomous vehicle 124 or a connected vehicle 122 based on the detected presence of the special vehicle and additional data from the different sources. Additional, different, or fewer components may be included. Different components may be co-located or may be located in the cloud. As an example, the special vehicle machine learning detection system 126 may be included with the one or more connected devices 122 or may be implemented by the location cloud platform 121 or other network connected system. The autonomous vehicle 124 may include or be a connected vehicle 122.

The one or more connected vehicles 122 (also referred to generally as connected devices 122) are configured to acquire data using one or more sensors. The one or more connected devices 122 may be configured to implement the special vehicle machine learning detection system 126 to detect the presence of a special vehicle from the acquired data. The one or more connected devices 122 may include probe devices, probe sensors, IoT (internet of things) devices, or other devices 122 such as personal navigation devices 122 or connected vehicles 122. The connected devices 122 may be a mobile device or a tracking device that provides samples of data for the location of a person or vehicle. The connected devices 122 may include mobile phones running specialized applications that collect location data as the connected devices 122 are carried by persons or things traveling a roadway system. The one or more connected devices 122 may include traditionally dumb or non-networked physical devices and everyday objects that have been embedded with one or more sensors or data collection applications and are configured to communicate over a network such as the internet. The devices may be configured as data sources that are configured to acquire roadway data. These connected devices 122 may be remotely monitored and controlled. The connected devices 122 may be part of an environment in which each connected device 122 communicates with other related devices in the environment to automate tasks. The devices may communicate sensor data to users, businesses, and, for example, the location cloud platform 121.

The connected devices 122 may also be integrated in or with a vehicle. The connected devices 122 may be implemented in a vehicle control system such as used in a HAD or ADAS vehicle. The connected devices 122 acquire data from multiple sources including but limited to the location cloud platform 121, other connected devices 122, other vehicles, and sensors included with or embedded in the vehicle that the device 122 is implemented with. A connected device 122 may provide assistance or provide commands for a vehicle control system to implement.

The connected device 122 may be configured as a navigation system for an autonomous vehicle 124 or a HAD. Any of these assisted driving systems may be incorporated into the connected device 122. Alternatively, an assisted driving device may be included in the vehicle. The assisted driving device may include memory, a processor, and systems to communicate with a connected device 122. The assisted driving vehicles may response to geographic data received from geographic database 123 and the server 125. An autonomous vehicle 124 or HAD may take route instructions based on a road segment and node information provided to the navigation device 122. An autonomous vehicle 124 or HAD may be configured to receive routing instructions from a location cloud platform 121 and automatically perform an action in furtherance of the instructions. The autonomous vehicle's ability to understand its precise positioning, plan beyond sensor visibility, possess contextual awareness of the environment and local knowledge of the road rules are critical.

Autonomous vehicle 124 and other assisted vehicles rely on sensors to keep the vehicle in the correct lane, perform maneuvers, and/or avoid obstacles. The connected device 122 may be configured to provide lane level positioning of the vehicle. Lane level positioning may be provided using one or more sensor systems embedded in the vehicle or related thereto. Lane level positioning, for example, may be provided using a series of GPS points acquired by the connected device 122. In an embodiment, the location of the vehicle is map matched to a lane using the sensor data. The vehicle's location within the lane may also be determined. A GPS value may be used to identify the road segment using a map matching algorithm to match the GPS coordinates to a stored map and road segment. Lane level map matching may provide a good estimate of what lane a vehicle is on given a sequence of GPS probes coming from the vehicle. Other sensor data may be used to identify the lane, position in the lane, and road segment that the vehicle is operating on. The connected device 122 may use data from lateral acceleration sensors. Lane changes and positioning may be detected by determining a threshold of acceleration x time, above which a lane change would have occurred. The connected device 122 may only detect that the change was of sufficient magnitude and direction to have a displacement greater than the lane width. The connected device 122 may use inertial measurement units (IMU), gyro compasses, gyro-like compasses, or magnetometers of sufficient sensitivity to indicate if the vehicle is or is not turning onto another road. For example, a value would be less than a 45-degree total change without a road curvature. The connected device 122 may use a lateral acceleration method indicating initiation of a lane change, followed by lateral deceleration without a large change in direction to indicate completion of the lateral displacement. A determination of intent or completion of a lane change may be determined by the connected device 122 using individual techniques or a combination of multiple techniques. The connected device 122 may acquire data from multiple sensors from which intent or completion of lane maneuvers may be derived. For lane level map matching, using historical raw GPS probe positions, a layer of abstraction may be created over a map which is used to generate lane probabilities of real-time probes based on their lateral position. The probabilities form emissions probabilities of a hidden Markov model in which a Viterbi algorithm is used to make an inference of the actual most probable lane a probe trajectory traversed.

In order to operate safely and efficiently, connected vehicles 122 collect data about the roadway and the environment around the vehicle. The connected vehicle 122 uses sensory input devices like cameras, radar, and lasers to allow the connected vehicle 122 to identify the environment and the objects around the connected vehicle 122. Object detection is a two-part process, image classification and then image localization. Image classification is determining what the objects in the image are, like a car or a person, while image localization is providing the specific location of these objects. In the case of AV's (which are connected vehicles 122), the connected vehicle 122 also has to perform object detection in real-time in order to detect objects approaching quickly and avoid them. The data obtained may be combined with 3D maps to spot objects like traffic lights, vehicles, and pedestrians to help make decisions in real time. Different sensors equipped in a connected vehicle 122 can be used for perception and localization detection which are two of the fundamental technologies in autonomous driving world. Lidar, Camera, and radar are able to help the autonomous vehicle 124 to sense it surrounding environment like traffic light, pedestrian, road sign, . . . etc.

Radar is used detect the object's distance, velocity, range, by sending radio waves. The most use cases are parking assistance and blind detection. LIDAR (Light detection and tanging) is used to determine the object's distance by creating the 3D rendering images of the connected vehicle's surrounding by spinning laser emitting millions of light pulses per second to view and measure each point the laser scanned. A camera may be used to detect road surface, lane marking, road signs through latest CNN (Convolutional Neural Network) and DNN (Deep Neural Network) machine learning image technologies. A satellite system like GPS, GLONASS, BEIDOU, together with Wi-Fi, Bluetooth, and inertial sensors like Gyro and Accelerometer, and HD-MAP may be used to help the connected vehicle 122 determine its precise location. To support ADAS systems, V2X sensors (4G/5G modem) may help exchange the information including HD map, real time traffic, road hazard, weather, parking between the autonomous driving vehicle and back-end infrastructure.

The connected vehicle 122 may implement the special vehicle machine learning detection system 126 in order to detect the presence of a special vehicle on the roadway using sensor data acquired by the connected vehicle 122. In an embodiment, the detection task may be performed at the vehicle or alternatively, at the location cloud platform 121 or another network connected device 122. The special vehicle machine learning detection system 126 is configured to input the sensor data from the connected vehicle 122 and output a classification that indicates the presence or absence of a special vehicle. The sensor data may include but is not limited to camera image data, a time stamp, geolocation, a speed limit, Lidar data, Radar data, and road signage, among other acquired data.

The special vehicle machine learning detection system 126 may provide additional information about the special vehicle including signage, size, configuration, or detailed classification.

The special vehicle machine learning detection system 126 may use machine learning to process the sensor data and provide a classification and/or additional information. The machine learning system may be edge computing system in-vehicle or backend machine learning system. The special vehicle machine learning detection system 126 may use advance image techniques to detect the type of special vehicle, its location, and time stamp, and for example a driving speed of the special vehicle.

Figure 3:
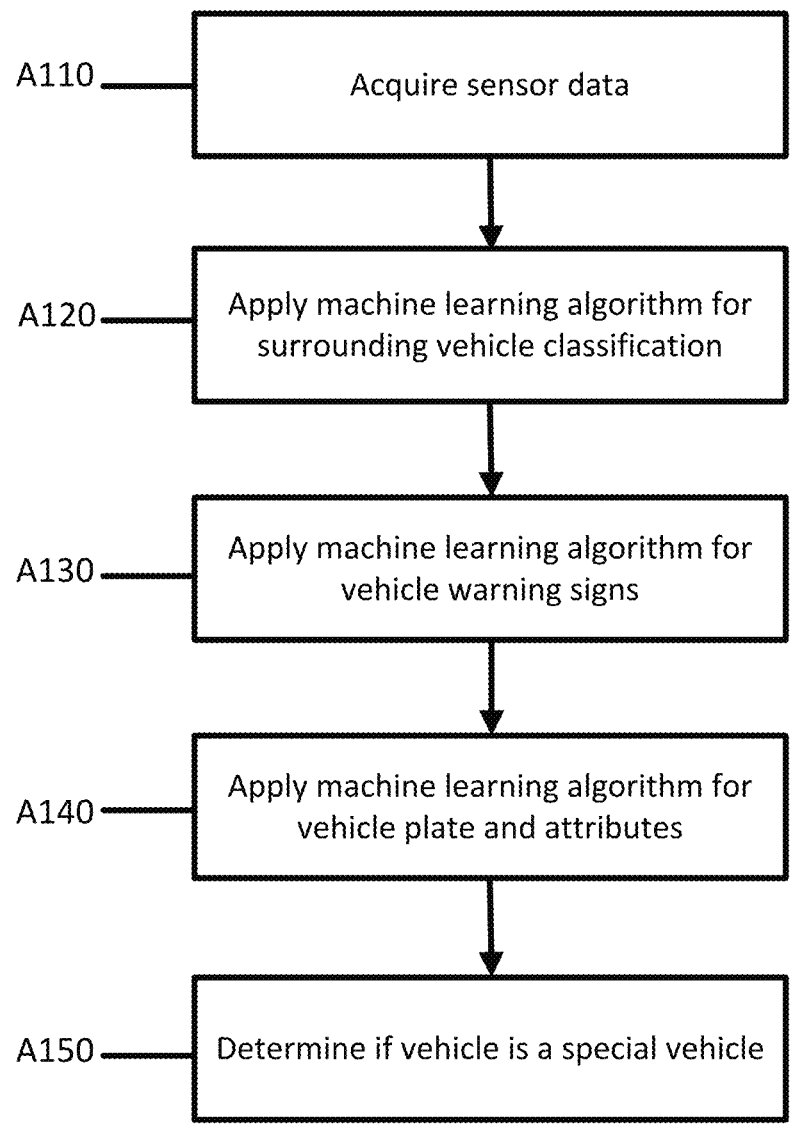
FIG. 3 depicts an example method for detecting special vehicles on a roadway according to an embodiment.

FIG. 3 depicts an example workflow for detecting the presence of a special vehicle on the roadway. As presented in the following sections, the acts may also in part be performed using any combination of the components indicated in FIG. 2, 6, or 7. For example, certain acts may be performed by the location cloud platform 121, the connected device 122, or a combination thereof. Additional, different, or fewer acts may be provided. The acts are performed in the order shown or other orders. The acts may also be repeated. Certain acts may be skipped.

At act A110, the special vehicle machine learning detection system 126 receives sensor data from vehicles on the roadway network. The special vehicle machine learning detection system 126 may use data from a single vehicle or multiple vehicles.

At act A120, the special vehicle machine learning detection system 126 applies a machine learning algorithm for surrounding vehicle classification. At act A130, the special vehicle machine learning detection system 126 applies a machine learning algorithm for vehicle warning sign detection. At act A140, the special vehicle machine learning detection system 126 applies a machine learning algorithm for vehicle plate and other attributes classification.

In an example of a special vehicle operating in the United States, detection may include determining the size, safety equipment, signage, and escorts for a special vehicle. In the US, the maximum legal load width for vehicles on a roadway is typically 8.5 feet, and the maximum height limit is 13.5 to 14.5 feet. Legal length, both in definition and measured length, varies significantly from state to state. Although maximum vehicle width by state may vary as well, the width of 8.5 is almost uniform since it is based on the standard width of a highway travel lane, which is typically 12 feet for Interstates and major highways.

Any vehicle with a load of more than 8.5 feet wide may be, by definition, an oversize load, and with few exceptions will require a special operating permit to travel on public highways. In some cases, on local, narrower roads, the maximum legal trailer width may be just 8 feet. Depending upon the state, once the width of a load exceeds 12 or 14 feet, there are additional requirements and/or restrictions, such as the requirement for pilot or escort vehicles (P/EV) and limited permitted travel times and routes. Any load that exceeds 16 feet in width becomes a "superload" and subject to more requirements to ensure that the load can be moved safely. Some superloads may require temporary road closures and attendance of state police or other law enforcement.

Safety equipment is a key element in hauling any overdimensional load. Safety equipment includes warning signs, flags, and lights to ensure that other drivers are aware of, and can see, the edges and ends of the oversize load. Typically, states require the hauling vehicle to have a yellow and black "WIDE LOAD" or "OVERSIZE LOAD" sign or banner across the front of the towing vehicle and at the back of the vehicle or at the end of the load if it extends beyond the rear of the hauling vehicle.

Warning flags, red or fluorescent orange, for example 18 in square, may be attached to forward and rear corners of the oversize load. Additional flags may be attached to any extensions or protuberances that extend farther from the sides of the vehicle and the corners. Most states do not require escort vehicles for loads that are no more than 10 feet wide, while a few states require escort vehicles for all oversize loads. Depending on the type and size of the load, only one, or two escort vehicles will be required. For example, on highways that are not divided highways, an escort vehicle may be required in front of the load, whereas on a divided highway such as an Interstate, the escort may only be required behind the load. Additionally, in some states, all oversize loads moved during the night may require escort vehicles. For loads more than 10 feet wide, up to an absolute limit, usually about 14 feet wide, escort vehicles may be required both in front of, and behind the load.

The special vehicle machine learning detection system 126 is configured to detect these attributes of a vehicle in order to determine that the vehicle/object is a special vehicle. The special vehicle machine learning detection system 126 may be configured to use a model to identify or classify an object or vehicle on the roadway. The model may be a classifier that is trained using supervised learning. The classification model may input the sensor data. For act A120, for example, the classification model may input image data, Lidar data, or radar data to detect the object or vehicle. For act A130, the special vehicle machine learning detection system 126 may input image data to detect signage on a detected vehicle. For act A140, the special vehicle machine learning detection system 126 may input image data, radar data, lidar data, speed data, location data, and/or other data to determine attributes of the special vehicle. The classification model may include a neural network that is defined as a plurality of sequential feature units or layers. Sequential is used to indicate the general flow of output feature values from one layer to input to a next layer. Sequential is used to indicate the general flow of output feature values from one layer to input to a next layer. The information from the next layer is fed to a next layer, and so on until the final output. The layers may only feed forward or may be bi-directional, including some feedback to a previous layer. The nodes of each layer or unit may connect with all or only a sub-set of nodes of a previous and/or subsequent layer or unit. Skip connections may be used, such as a layer outputting to the sequentially next layer as well as other layers. Rather than pre-programming the features and trying to relate the features to attributes, the deep architecture is defined to learn the features at different levels of abstraction based on the input data. The features are learned to reconstruct lower-level features (i.e., features at a more abstract or compressed level). Each node of the unit represents a feature. Different units are provided for learning different features. Various units or layers may be used, such as convolutional, pooling (e.g., max pooling), deconvolutional, fully connected, or other types of layers. Within a unit or layer, any number of nodes is provided. For example, 100 nodes are provided. Later or subsequent units may have more, fewer, or the same number of nodes. A classification step may happen in the last layer and takes the key features of the sample as input from the previous layers. There are different classification functions, depending on the use case. An embodiment uses a Softmax function—where for each sample, the result is the probability distribution over the classes.

Different neural network configurations and workflows may be used for the network such as a convolution neural network (CNN), deep belief nets (DBN), or other deep networks. CNN learns feed-forward mapping functions while DBN learns a generative model of data. In addition, CNN uses shared weights for all local regions while DBN is a fully connected network (e.g., including different weights for all regions of a feature map. The training of CNN is entirely discriminative through backpropagation. DBN, on the other hand, employs the layer-wise unsupervised training (e.g., pre-training) followed by the discriminative refinement with backpropagation if necessary. In an embodiment, the arrangement of the trained network is a fully convolutional network (FCN). Alternative network arrangements may be used, for example, a 3D Very Deep Convolutional Networks (3D-VGGNet). VGGNet stacks many layer blocks containing narrow convolutional layers followed by max pooling layers. A 3D Deep Residual Networks (3D-ResNet) architecture may be used. A Resnet uses residual blocks and skip connections to learn residual mapping.

Supervised or unsupervised learning may be used to compute classification. Unsupervised learning may be based on the distribution of the samples, using methods such as k-nearest neighbor. In supervised learning, training or labeled data is used to configure the network. The training data for the model/network (and other networks) includes ground truth data or gold standard data, for example actual detected or identified special vehicle and attributes that have been verified, for example, by on the ground personal. Ground truth data and gold standard data is data that includes correct or reasonably accurate labels that are verified manually or by some other accurate method. The training data may be acquired at any point prior to inputting the training data into the network.

The special vehicle machine learning detection system 126 may iteratively train or configure the model(s) using a set of historical training data that includes annotated (known or identified) special vehicle data. The training data is input into the model(s) which outputs insight into a classification/attributes of the special vehicle. The output is compared the annotation. The comparison is used to adjust the model/network until the model is optimized. For the machine learning task described above and herein, the model (also referred to as machine learning model, neural network, or network) may be trained using one or more optimization algorithms such as gradient decent. Training using an optimization method such as gradient descent includes determining how close the model estimates the target function. The determination may be calculated a number of different ways that may be specific to the particular model being trained. The cost function involves evaluating the parameters in the model by calculating a prediction for the model for each training instance in the dataset and comparing the predictions to the actual output values and calculating an average error value (such as a value of squared residuals or SSR in the case of linear regression). In a simple example of linear regression, a line is fit to a set of points. An error function (also called a cost function) is defined that measures how good (accurate) a given line is. In an example, the function inputs the points and return an error value based on how well the line fits the data. To compute the error for a given line, in this example, each point (x, y) is iterated in the data set and the sum the square distances between each point's y value and the candidate line's y value is calculated as the error function. Gradient descent may be used to minimize the error functions. Given a function defined by a set of parameters, gradient descent starts with an initial set of parameter values and iteratively moves toward a set of parameter values that minimize the function. The iterative minimization is based on a function that takes steps in the negative direction of the function gradient. A search for minimizing parameters starts at any point and allows the gradient descent algorithm to proceed downhill on the error function towards a best outcome. Each iteration updates the parameters that yield a slightly different error than the previous iteration. A learning rate variable is defined that controls how large of a step that is taken downhill during each iteration.

Alternative optimization algorithms may be used. For example, stochastic gradient decent is a variation of gradient decent that may be used. Nesterov accelerated gradient (NAG) is another algorithm that solves a problem of momentum when an algorithm reaches the minima i.e., the lowest point on the curve. Adaptive Moment Estimation (Adam) is another method that computes adaptive learning rates for each parameter. In addition to storing an exponentially decaying average of past squared gradients like AdaDelta, Adam also keeps an exponentially decaying average of past gradients M(t), similar to momentum. Depending on the model, different types of optimization algorithms, e.g., first order or second order (hessian) may be used. Any algorithm that executes iteratively by comparing various solutions until an optimum or a satisfactory solution is found may be used to train the model. The trained model may be configured and stored at the location cloud platform 121. The trained model may be deployed to a networked cloud-based environment or to the one or more connected devices 122.

Referring back to FIG. 3, at act A150, the special vehicle machine learning detection system 126 determines if the detected vehicle/object is a special vehicle and any attributes derived from the outputs of the machine learning algorithms. The special vehicle machine learning detection system 126 communicates the detection and the attributes to the location cloud platform 121.

The location cloud platform 121 is configured to acquire/receive data from one or more sources, process the data, and generate notifications/warnings about a detected special vehicle on the roadway. To communicate with the connected devices 122, systems or services, the location cloud platform 121 is connected to the network. The one or more connected devices 122 may communicate probe data/reports to the server 125 or location cloud platform 121 using the network. The location cloud platform 121 may receive or transmit data through the network. The location cloud platform 121 may also transmit paths, routes, or probe data through the network. The location cloud platform 121 may also be connected to an OEM cloud that may be used to provide mapping services to vehicles via the OEM cloud or directly by the location cloud platform 121 through the network. The network may include wired networks, wireless networks, or combinations thereof. The wireless network may be a cellular telephone network, LTE (Long-Term Evolution), 4G LTE, a wireless local area network, such as an 802.11, 802.16, 802.20, WiMAX (Worldwide Interoperability for Microwave Access) network, DSRC (otherwise known as WAVE, ITS-G5, or 802.11p and future generations thereof), a 5G wireless network, or wireless short-range network such as Zigbee, Bluetooth Low Energy, Z-Wave, RFID and NFC. Further, the network may be a public network, such as the Internet, a private network, such as an intranet, or combinations thereof, and may utilize a variety of networking protocols now available or later developed including, but not limited to transmission control protocol/internet protocol (TCP/IP) based networking protocols. The connected devices 122 may use Vehicle-to-vehicle (V2V) communication to wirelessly exchange information about their speed, location, heading, and roadway conditions with other vehicles, connected devices 122, or the location cloud platform 121. V2V may be used to communicated information about detected special vehicles. The connected devices 122 may use V2V communication to broadcast and receive omni-directional messages creating a 360-degree "awareness" of other vehicles in proximity of the vehicle. Vehicles equipped with appropriate software may use the messages from surrounding vehicles to determine potential threats or obstacles as the threats develop. The connected devices 122 may use a V2V communication system such as a Vehicular ad-hoc Network (VANET).

The location cloud platform 121 may be configured to input data from the connected devices 122, traffic data, map data, and registration data among other sources. Traffic service providers provide road traffic information and incident information by aggregating the probe vehicle geolocation data and sensor data. Map service providers provide HD map data to support autonomous vehicle 124 driving on lane level information. With high-speed network connections, connected vehicles 122 may be capable of reporting all kinds of vehicle sensor data to the back end including road work, road construction, road sign, sensor data, among other data in real time. As described above, the location cloud platform 121 receives data from the connected device(s) 122 that describe the detection of the special vehicle and any derived attributes such as the size, weight, signage, etc. Third party data may be acquired from datastores, for example, governmental registration for the special vehicle.

The location cloud platform 121 may be configured to acquire data from the geographic database 123 to provide notifications to the connected devices 122, for example about how to operate around a detected special vehicle. The geographic database 123 is configured to store digital mapping data for the roadway. The geographic database 123 may include map data representing a road network or system including road segment data and node data. The road segment data represent roads, and the node data represent the ends or intersections of the roads. The road segment data and the node data indicate the location of the roads and intersections as well as various attributes of the roads and intersections. Other formats than road segments and nodes may be used for the map data. The map data may include structured cartographic data or pedestrian routes. The map data may include map features that describe the attributes of the roads and intersections. The map features may include geometric features, restrictions for traveling the roads or intersections, roadway features, or other characteristics of the map that affects how vehicles or connected devices 122 traverse a geographic area. The geometric features may include curvature, slope, or other features. The curvature of a road segment describes a radius of a circle that in part would have the same path as the road segment. The slope of a road segment describes the difference between the starting elevation and ending elevation of the road segment. The slope of the road segment may be described as the rise over the run or as an angle. The geographic database 123 may also include other attributes of or about the roads such as, for example, geographic coordinates, street names, address ranges, speed limits, turn restrictions at intersections, and/or other navigation related attributes (e.g., one or more of the road segments is part of a highway or toll way, the location of stop signs and/or stoplights along the road segments), as well as points of interest (POIs), such as gasoline stations, hotels, restaurants, museums, stadiums, offices, automobile dealerships, auto repair shops, buildings, stores, parks, etc. The databases may also contain one or more node data record(s) which may be associated with attributes (e.g., about the intersections) such as, for example, geographic coordinates, street names, address ranges, speed limits, turn restrictions at intersections, and other navigation related attributes. The geographic data may additionally or alternatively include other data records such as, for example, POI data records, topographical data records, cartographic data records, routing data, and maneuver data. The data in the geographic database 123 may be organized using a graph that specifies relationships between entities. A location graph is a graph that includes relationships between location objects in a variety of ways. Objects and their relationships may be described using a set of labels. Objects may be referred to as "nodes" of the location graph, where the nodes and relationships among nodes may have data attributes. The organization of the location graph may be defined by a data scheme that defines the structure of the data. The organization of the nodes and relationships may be stored in an ontology which defines a set of concepts where the focus is on the meaning and shared understanding. These descriptions permit mapping of concepts from one domain to another. The ontology is modeled in a formal knowledge representation language which supports inferencing and is readily available from both open-source and proprietary tools.

The HD map and the geographic database 123 may be maintained and updated by the location cloud platform 121. The location cloud platform 121 may include multiple servers, workstations, databases, and other machines connected together and maintained by a map developer. The location cloud platform 121 may be configured to acquire and process data relating to roadway or vehicle conditions. For example, the location cloud platform 121 may receive and input data such as vehicle data, user data, weather data, road condition data, road works data, traffic feeds, etc. The data may be historical, real-time, or predictive.

The location cloud platform 121 may be configured to acquire data from a traffic flow and incident system 134 to provide notifications to the connected devices 122, for example about how to operate around a detected special vehicle. The traffic flow and incident system 134 may provide real-time traffic and accident reports to the geographic database or the location cloud platform 121. The traffic flow and incident system 134 data may be used by the location cloud platform 121 to determine routes, travel times, roadway hazards, etc. The location cloud platform 121 may provide instructions to connected vehicles 122 based on, for example, traffic data.

The location cloud platform 121 may be configured to acquire data from a third-party special vehicle datastore 132 to provide notifications to the connected devices 122, for example about how to operate around a detected special vehicle. The third-party special vehicle datastore 132 may contain and provide data about a detected special vehicle. The third-party special vehicle datastore 132 may be provided by a governmental agency or other agency, for example an agency that is responsible for regulating special vehicle operation for a location such as a city, state, province, country, etc. Regulations for trucks or large vehicles may be different than regulations for typical vehicles. Special vehicles may require additional or different regulations due to the weight or handling of the larger vehicles. In addition, the types and uses of special vehicles may vary from slightly larger two axle vehicles to enormous semi-tractor trailers to platoons of multiple special vehicles. Each vehicle may have different dimensions and different weights. Attributes for special vehicles may be stored in the third party datastore. In an example, special vehicles may register with a local authority. The registration may include the weight and size of the special vehicle, signage, escort status, route, etc. Attributes may also be provided by other agencies or locations, such as weigh stations. The third-party special vehicle datastore 132 may alternatively be provided by, for example, a trucking company or shipping company that maintains detailed information about each special vehicle that they operate.

The location cloud platform 121 may receive the data in real time, with the minimum latency, or as provided by the different sources. The location cloud platform 121 is configured to input data from one or more sources and output notifications, warnings, informational messages, instructions, etc. The location cloud platform 121 may be configured to track the special vehicle position based on the data from different sources. The location cloud platform 121 may be configured to map matching the special vehicle to a lane level using the HD MAP. The location cloud platform 121 may be configured to determine one or more rules or regulations of the special vehicle driving and generate a warning message if necessary. The location cloud platform 121 may be configured to determine a safety distance in front of or back of the special vehicle and generate a driving guidance (no lane switching, keep 50 meters distances from or backend, . . . no parallel driving, . . . etc.) message if necessary. The location cloud platform 121 may be configured to determine if the presence of the special vehicle requires the surround autonomous vehicles to disengage autonomous driving operations based on the special vehicle type, load, load materials and other attributes. The location cloud platform 121 may be configured to compose special vehicle information as dynamic content packages to be delivered to on field vehicles through wireless technologies, (2G/3G/4G/5G), v2v, v2I communications. The location cloud platform 121 may be configured to generate and deliver geofence warning messages when other vehicle approaching to special vehicle within certain radius or distances.

The location cloud platform 121 is configured to determine attributes for the special vehicle including but not limited to its location, width, vehicle length, size, how many lanes it occupies, load, brake distance or geo defense distance, OD information using all available information. A warning or informational message may be generated to send to on-field surrounding driving vehicles along with all special vehicle attributes including up to date tracking information that details the location and status of the special vehicle and any other relevant information derived from the data from the multiple sources. In an example, a warning may be provided whether or not to allow other vehicle switch lane or drive behind or front in certain distances for both surround AV or special vehicle itself in terms of improving driving safety using v2v or v2I communication technology. In certain special situations, disengage AV operation decision may also be suggested by the location cloud platform 121: for example, when dangerous or poisonous material load vehicles in clement weathers or reduce visibility situations.

The location cloud platform 121 may be a host for a website or web service such as a mapping service and/or a navigation service. The mapping service may provide standard maps or HD maps generated from the geographic data of the database 123, and the navigation service may generate routing or other directions from the geographic data of the database 123. The mapping service may also provide information generated from attribute data included in the database 123. The location cloud platform 121 may also provide historical, future, recent or current traffic conditions for the links, segments, paths, or routes using historical, recent, or real time collected data. The location cloud platform 121 is configured to communicate with the devices 122 through the network. The server 125 is configured to receive a request from a device 122 for a route or maneuver instructions and generate one or more potential routes or instructions using data stored in the geographic database 123. The location cloud platform 121 may be configured to provide the notifications, warnings, informational messages, instructions to a connected vehicle 122 such as an autonomous vehicle 124.

Figure 4:
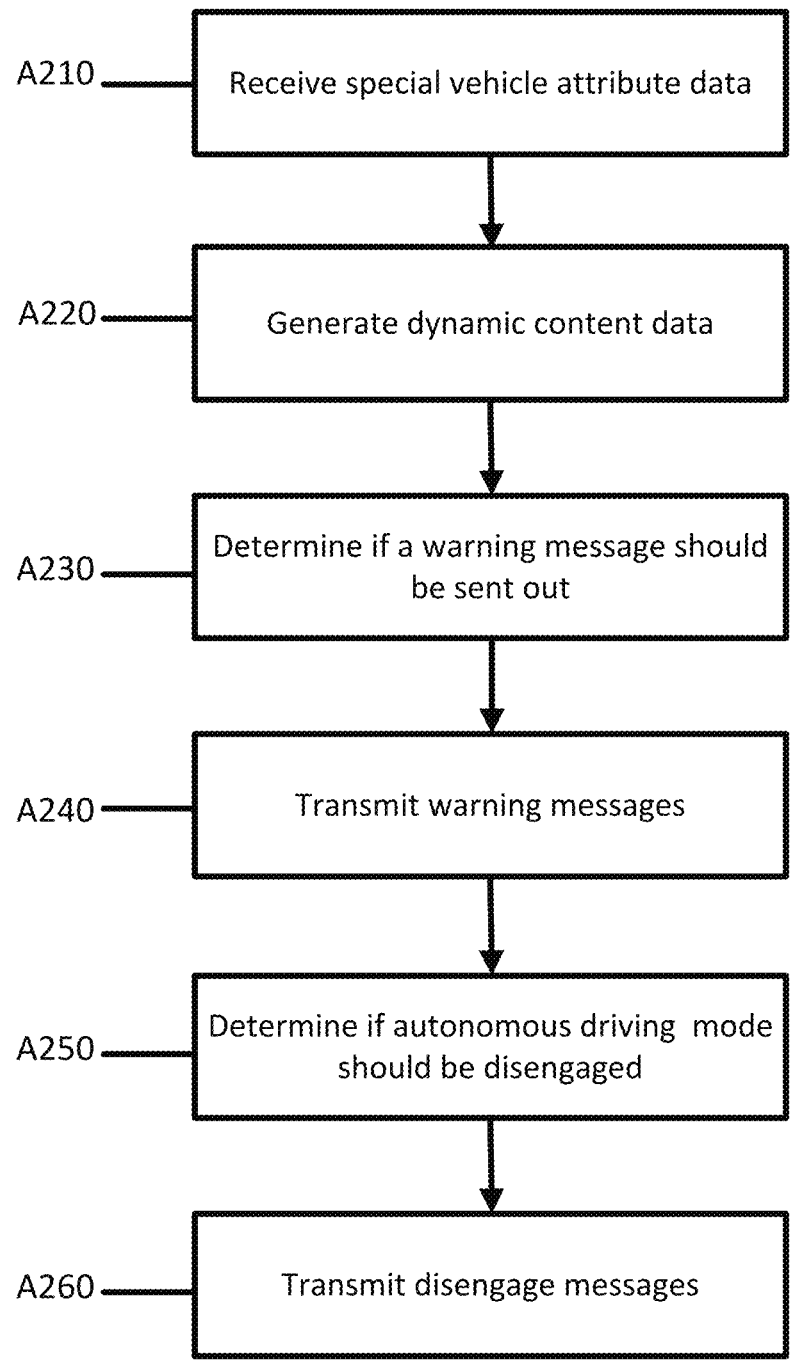
FIG. 4 depicts an example method for generating warning messages on a roadway according to an embodiment.

FIG. 4 depicts an example workflow for generating dynamic content warning message relating to the presence of a special vehicle. As presented in the following sections, the acts may also in part be performed using any combination of the components indicated in FIG. 2, 6, or 7. For example, certain acts may be performed by the location cloud platform 121, the connected device 122, or a combination thereof. Additional, different, or fewer acts may be provided. The acts are performed in the order shown or other orders. The acts may also be repeated. Certain acts may be skipped.

At act A210, the location cloud platform 121 receives special vehicle attributes from one or more connected devices 122. At act A220, the location cloud platform 121 generates dynamic content data that is published and distributed. Table 1 below shows examples of different special vehicle examples with attributes provided either from machine learning platform using sensor data or from third party providers.

lead to a determination that the AV system should disengage and let the human operator take over control of the vehicle. In another example, a different route may be generated for the AV to follow.

At act A206, the location cloud platform 121 transmits the disengage warning messages to Avs in the vicinity of the special vehicle. It is the up to the vehicle or operator to make the decision whether no not to continue autonomous driving when receiving disengaging warning messages from the location cloud platform 121.

Figure 5:
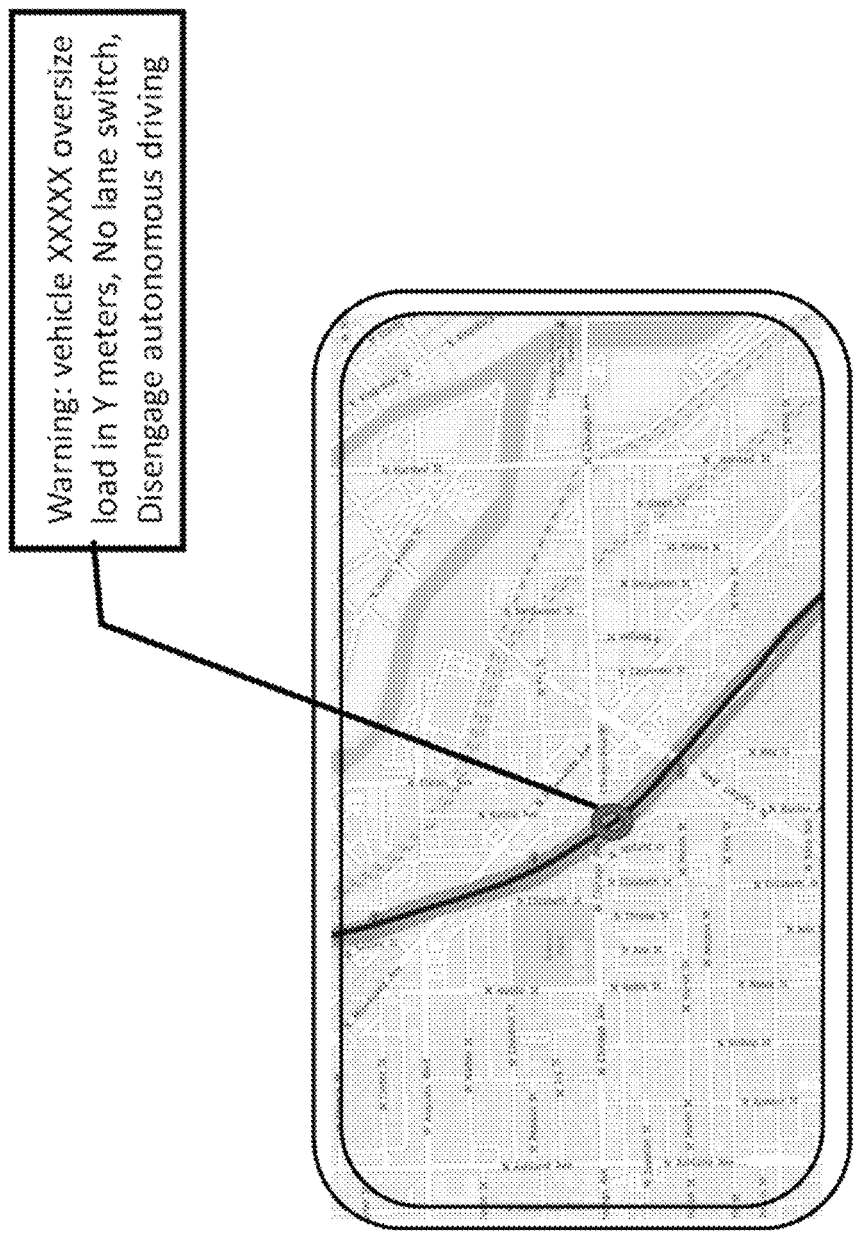
FIG. 5 depicts an example disengage message according to an embodiment.

FIG. 5 depicts an example of an AV disengage message. As depicted, the warning indicates the location of the special vehicle and driving instructions.

The autonomous vehicle 124 is configured to input the notifications, warnings, informational messages, and/or instructions and to output driving maneuvers or informational messages to an operator. The term autonomous vehicle 124 may refer to a self-driving or driverless mode in which no passengers are required to be on board to operate the vehicle. An autonomous vehicle 124 may be referred to as a robot vehicle or an automated vehicle. The autonomous vehicle 124 may include passengers, but no driver is necessary. These autonomous vehicles may park themselves or move cargo between locations without a human operator. Autonomous vehicles may include multiple modes and transition between the modes. The autonomous vehicle 124 may steer, brake, or accelerate the vehicle based on the

| | | | | | Unit | | | | |
|---|---|---|---|---|---|---|---|---|---|
| Special vehicle type | Width inche | Length inch | Height inch | Weight lb | load materails String | Location (latitude, longitude) | Time stamp String | Plate number String | Brake distance feet | Geofence meters |
| Truck | 105 | 600 | 100 | 46000 | N/A | (Lat1, Lon1) | 11/4/2021 2:39:28 PM | IL 123456 | 250 | 150 |
| Wheel loader | 105 | 320 | 125 | 150000 | N/A | (Lat2, Lon2) | 11/4/2021 2:39:29 PM | CA 5B33845 | 150 | 120 |
| Track Type Tractor | 95 | 167 | 108 | 17900 | N/A | (Lat3, Lon3) | 11/4/2021 2:39:58 PM | OR 789X68 | 180 | 180 |
| Chemical Vehicle | 105 | 500 | 100 | 40000 | Heavy Oil | (Lat4, Lon4) | 11/4/2021 2:40:28 PM | TX R018305 | 250 | 250 |
| Forklift | ... | ... | ... | ... | N/A | ... | ... | ... | ... | ... |
| Mobile crane | ... | ... | ... | ... | N/A | ... | ... | ... | ... | ... |
| Snow plough | ... | ... | ... | ... | N/A | ... | ... | ... | ... | ... |
| ... | | | | | | | | | | |

Based on the information in Table 1, a composed dynamic content message is sent to road vehicles. The content message may include, for example, special vehicle contents including its location, width, vehicle length, size, how many lanes it occupies, load, brake distance or geo defense distance, OD information, etc.

At act A230, the location cloud platform 121 determines if a warning message needs to be sent out. The determination may be based on the type of special vehicle, load, weather, roadway conditions, etc. At act A240, the location cloud platform 121 transmits warning messages to connected vehicles 122. Once the warning message is determined, it will also be sent to all vehicles driving near by the special vehicles through v2v, v2I, wireless communication protocols (3G/4G/5G).

At act A250, the location cloud platform 121 determines if AVs in the vicinity of the special vehicle should disengage. The determination may be based on the type of special vehicle, load, weather, roadway conditions, etc. In an example, a special vehicle carrying a dangerous load may position of the vehicle in order, and may respond to lane marking indicators (lane marking type, lane marking intensity, lane marking color, lane marking offset, lane marking width, or other characteristics) received from the geographic database 123 and the location cloud platform 121 and driving commands or navigation commands. The autonomous vehicle 124 may steer, brake, or accelerate the vehicle based on warnings or information provided by the location cloud platform 121 concerning the presence of a special vehicle in the vicinity of the autonomous vehicle 124.

A highly assisted driving (HAD) vehicle may refer to a vehicle that does not completely replace the human operator. Instead, in a highly assisted driving mode, the vehicle may perform some driving functions and the human operator may perform some driving functions. Vehicles may also be driven in a manual mode in which the human operator exercises a degree of control over the movement of the vehicle. The vehicles may also include a completely driverless mode. Other levels of automation are possible. The HAD vehicle may control the vehicle through steering or braking in response to the on the position of the vehicle and may respond to lane marking indicators (lane marking type, lane marking intensity, lane marking color, lane marking offset, lane marking width, or other characteristics) received from the geographic database 123 and the location cloud platform 121 and driving commands or navigation commands.

Similarly, ADAS vehicles include one or more partially automated systems in which the vehicle alerts the driver. The features are designed to avoid collisions automatically. Features may include adaptive cruise control, automate braking, or steering adjustments to keep the driver in the correct lane. ADAS vehicles may issue warnings for the driver based on the position of the vehicle or based on the lane marking indicators (lane marking type, lane marking intensity, lane marking color, lane marking offset, lane marking width, or other characteristics) received from geographic database 123 and the server 125 and driving commands or navigation commands.

For the AV, HAD, or ADAS vehicle, precise lane level positioning may be provided using LiDAR, RADAR, video, images, or other sensors on a vehicle. For example, the connected device 122 may determine a current position or location in a lane based on image recognition techniques and a stored HD map. The connected device 122 may use LiDAR and RADAR to recognize information from the environment, such as curbs, road shapes, rails, vehicles, and road infrastructures. As an example, LiDAR components emit and receive laser signals to directly measure the distance and intensity from the sensor to the objects. The LiDAR sensor may be configured to provide a 3D representation of the surrounding environment up to a distance of several hundred meters via installation of the sensor on top of the vehicle. For positioning data, the connected device 122 may identify lane markings from a difference in the intensity between the asphalt and the ink painting from the ground data.

The connected device 122 may also use passive sensors, such as vision-based techniques with cameras or other imaging sensors. The connected device 122 may use a vision-based technique to calculate an odometry from feature points of an acquired image, and positioning in realtime. The connected device 122 identifies lane markings and GPS and inertial measurement units (IMU) provide the positioning. The connected device 122 may also use a map-matching method provided by a precise high-definition (HD) map. An HD map, stored in or with the geographic database 123 or in the devices 122 is used to allow a device 122 to identify precisely where it is with respect to the road (or the world) far beyond what the Global Positioning System (GPS) can do, and without inherent GPS errors. The HD map allows the connected device 122 to plan precisely where the connected device 122 may go, and to accurately execute the plan because the connected device 122 is following the map. The HD map provides positioning and data with decimeter or even centimeter precision.

A connected vehicle 122 may receive dynamic content data, for example, weather data, traffic data, incident data, map data, hazard warning data, traffic pattern data, . . . etc. that may be relevant to operation around the special vehicle. In an embodiment, the special vehicle's location and status is continuously monitored by the location cloud platform 121. The ingested or detected special vehicle data is aggregated, and map matched on lane level in the HD map in the cloud process engine in which a safety warning message can be composed and deliver to on field driving vehicles.

Figure 6:
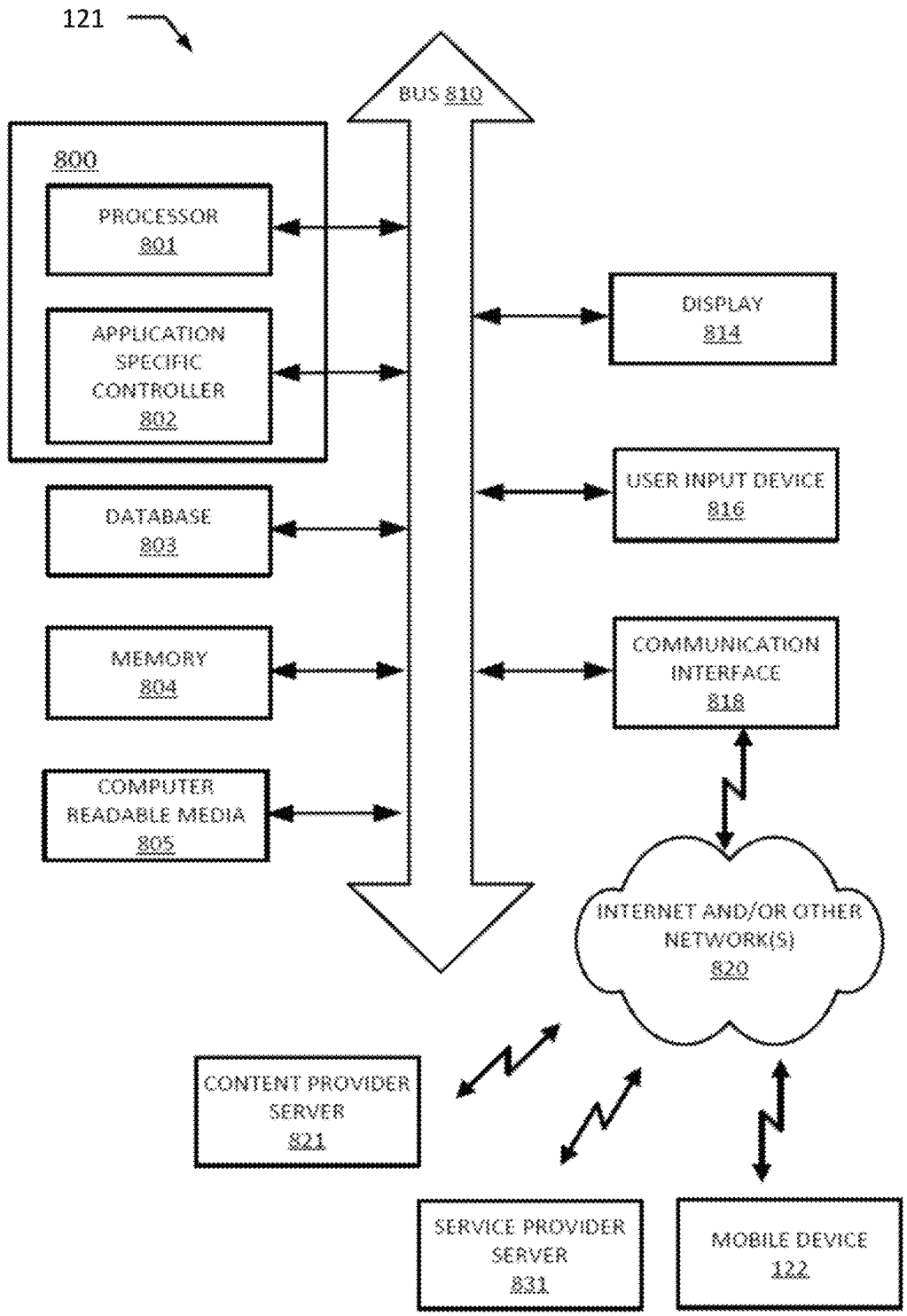
FIG. 6 depicts an example system for special vehicle notification according to an embodiment.

FIG. 6 depicts an example location cloud platform 121 for the system of FIG. 2 that is configured for detecting a special vehicle and its attributes and generating messages related thereto. The location cloud platform 121 may include a bus 810 that facilitates communication between a controller 800 that may be implemented by a processor 801 and/or an application specific controller 802, which may be referred to individually or collectively as the controller 800, and one or more other components including a database 803, a memory 804, a computer readable medium 805, a display 814, a user input device 816, and a communication interface 818 connected to the internet and/or other networks 820. The contents of database 803 are described with respect to the geographic database 123. The server-side database 803 may be a master database that provides data in portions to the database of the connected/mobile device 122. Additional, different, or fewer components may be included. The memory 804 and/or the computer readable medium 805 may include a set of instructions that can be executed to cause the location cloud platform 121 to perform any one or more of the methods or computer-based functions disclosed herein, for example, the components or functions as described in FIG. 2. The location cloud platform 121 may be in communication through the network 820 with a content provider server 821 and/or a service provider server 831. The location cloud platform 121 may provide mapping or navigation related services or data to the content provider server 821 and/or the service provider server 831. The content provider may include device manufacturers that provide location-based services.

In a networked deployment, the system of FIG. 6 may alternatively operate or as a client user computer in a client-server user network environment, or as a peer computer system in a peer-to-peer (or distributed) network environment. It can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. While a single computer system is illustrated, the term "system" shall also be taken to include any collection of systems or sub-systems that individually or jointly execute a set, or multiple sets, of instructions to perform one or more computer functions. The location cloud platform 121 may be in communication through the network 820 with a content provider server 821 and/or a service provider server 831. The location cloud platform 121 may provide the machine learning detection algorithms. The location cloud platform 121 may receive data from a connected device 122 that implements the machine learning detection algorithms.

Figure 7:
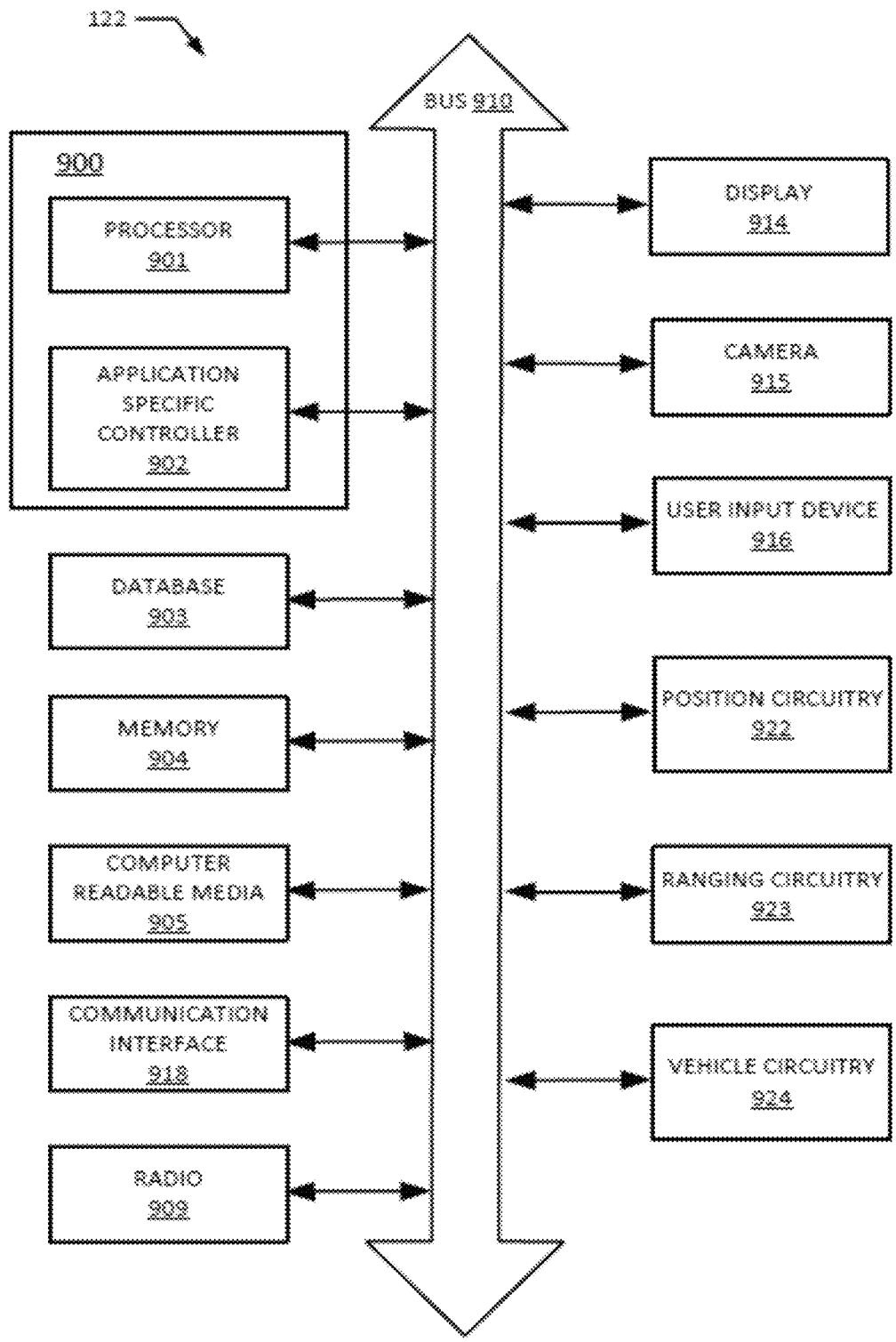
FIG. 7 depicts an example device for special vehicle notification according to an embodiment.

FIG. 7 illustrates an example connected device 122 for the system of FIG. 2. The connected device 122 is configured to provide and process sensor data for use in detecting and providing notifications for special vehicles. The connected device 122 is further configured to receive information and instructions from the location cloud platform 121 and take appropriate actions in response. The connected device 122 may include a bus 910 that facilitates communication between a controller 900 that may be implemented by a processor 901 and/or an application specific controller 902, which may be referred to individually or collectively as controller 900, and one or more other components including a database 903, a memory 904, a computer readable medium 905, a communication interface 918, a radio 909, a display 914, a camera 915, a user input device 916, position circuitry 922, ranging circuitry 923, and vehicle circuitry 924. The contents of the database 903 are described with respect to the geographic database 123. The device-side database 903 may be a user database that receives data in portions from the database 903 of the connected device 122. The communication interface 918 connected to the internet and/or other networks (e.g., network shown in FIG. 1). The vehicle circuitry 924 may include any of the circuitry and/or devices used or interacted with by an ADAS, HAD, or AV system. Additional, different, or fewer components may be included.

The connected device 122 may be a personal navigation device ("PND"), a portable navigation device, a mobile phone, a personal digital assistant ("PDA"), a watch, a tablet computer, a notebook computer, and/or any other known or later developed mobile device or personal computer. The connected device 122 may also be an automobile head unit, infotainment system, and/or any other known or later developed automotive navigation system. Non-limiting embodiments of navigation devices may also include relational database service devices, mobile phone devices, car navigation devices, and navigation devices used for air or water travel.

Figure 8:
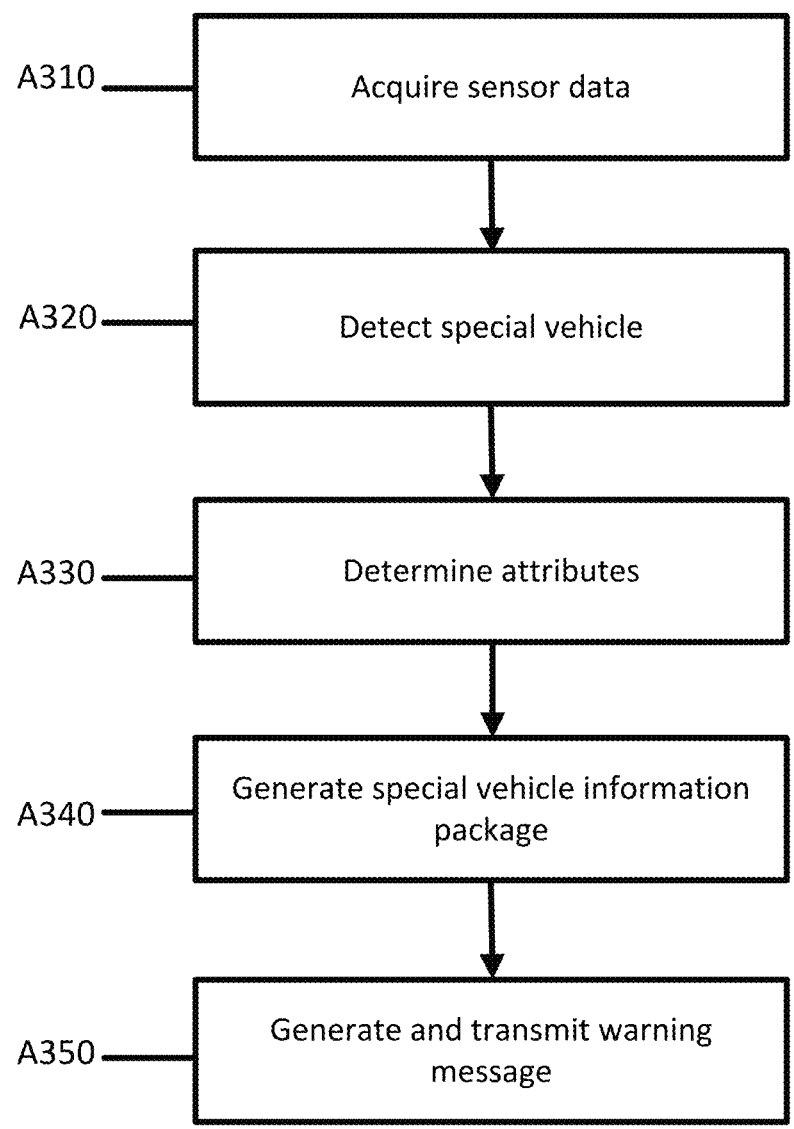
FIG. 8 depicts an example workflow for special vehicle notification according to an embodiment.

FIG. 8 depicts an example workflow for detecting special vehicles using the location cloud platform 121 of FIG. 6 and the device 122 of FIG. 7. As presented in the following sections, the acts may also in part be performed using any combination of the components indicated in FIG. 2, 6, or 7. For example, certain acts may be performed by the location cloud platform 121, the device 122, or a combination thereof. Additional, different, or fewer acts may be provided. The acts are performed in the order shown or other orders. The acts may also be repeated. Certain acts may be skipped.

The workflow includes where the location cloud platform 121 or the connected device 122 uses OEM streaming sensor data or probe data to detect special vehicle driving on road by utilizing a special vehicle detection machine learning system. The location cloud platform 121 ingests third party special vehicle driving data through real time streaming process. The location cloud platform 121 tracks the special vehicle position. The location cloud platform 121 map matches the special vehicle to lane level on a HD MAP. The location cloud platform 121 determines rules or regulations of the special vehicle driving and generates warning message if necessary. For example, the location cloud platform 121 determines the safety distance front or back of the special vehicle and generates a driving guidance (no lane switching, keep 50 meters distances from or backend, . . . no parallel driving, . . . etc.) message if necessary. The location cloud platform 121 determines if it requires the surround autonomous vehicle 124 to disengage autonomous driving operations based on the special vehicle type, load, load materials and other attributes. The location cloud platform 121 compose special vehicle information as dynamic content package to be delivered to on field vehicles through wireless technologies, (2G/3G/4G/5G), v2v, v2I communications. The location cloud platform 121 generates and delivers geofence warning messages when other vehicle approaching to special vehicle within certain radius or distances.

At Act A310, the connected device 122 acquires sensor data of one or more objects on a roadway. The sensor data may include image data, Lidar data, radar data, or other sensor data. The sensor data may include positioning data. The positioning circuitry 922 may include a Global Positioning System (GPS), Global Navigation Satellite System (GLONASS), or a cellular or similar position sensor for providing location data. The positioning system may utilize GPS-type technology, a dead reckoning-type system, cellular location, or combinations of these or other systems. The positioning circuitry 922 may include suitable sensing devices that measure the traveling distance, speed, direction, and so on, of the mobile device 122. The positioning system may also include a receiver and correlation chip to obtain a GPS signal. The connected device 122 receives location data from the positioning system. The location data indicates the location of the connected device 122.

The position circuitry 922 may also include gyroscopes, accelerometers, magnetometers, or any other device for tracking or determining movement of a connected device 122. The gyroscope is operable to detect, recognize, or measure the current orientation, or changes in orientation, of a mobile device 122. Gyroscope orientation change detection may operate as a measure of yaw, pitch, or roll of the connected device 122.

The connected device 122 may also be configured to acquire the data for the location using one or more sensors and/or the geographic database 123. The one or more sensors may include ranging circuitry 923, image/video cameras, weather sensors, occupant sensors, and any other vehicle sensor that collects data about the vehicle or the environment around the vehicle. For example, the ranging circuitry 923 may include a LIDAR system, a RADAR system, a structured light camera system, SONAR, or any device configured to detect the range or distance to objects from the connected device 122. The controller 900 of the device 122 may also communicate with a vehicle engine control unit (ECU) that operates one or more driving mechanisms (e.g., accelerator, brakes, steering device). Alternatively, the connected device 122 may be the vehicle ECU that operates the one or more driving mechanisms directly.

At Act A320, the connected device 122 detects a special vehicle on the roadway using the sensor data. The connected device 122 may implement one or more machine learning algorithms that are configured to detect and classify a special vehicle in the sensor data, for example, using image recognition techniques. The Machine learning system may be an edge computing system in-vehicle or backend machine learning system.

The connected device 122 may communicate with the server 125 to provide data about the detected special vehicle. The communication interface 918 and/or communication interface 918 may include any operable connection. An operable connection may be one in which signals, physical communications, and/or logical communications may be sent and/or received. An operable connection may include a physical interface, an electrical interface, and/or a data interface. The communication interface 918 provides for wireless and/or wired communications in any now known or later developed format. The radio 909 may be configured to radio frequency communication (e.g., generate, transit, and receive radio signals) for any of the wireless networks described herein including cellular networks, the family of protocols known as WIFI or IEEE 802.11, the family of protocols known as Bluetooth, or another protocol.

At Act A330, attributes are determined for the special vehicle. The attributes may be determined based on the sensor data or additional information. A third-party transportation logistics company may also provide the additional information about the special vehicles, for example, a geo location, vehicle width, vehicle length, vehicle height, how many lanes it occupies, load, brake distance or geo defense distance, OD information if not all available. In an embodiment the attributes are determined by the location cloud platform 121 after receiving a notification from the connected device 122 that a special vehicle has been detected. Once the special vehicle has been detected by using the sensor data or ingested from third party, the location cloud platform 121 may use a lane level map matcher to determine the location of the special vehicle and start tracking its position continuously.

At Act A340, a special vehicle information package is generated based on the attributes and a location of the special vehicle. The special vehicle contents may include its location, width, vehicle length, size, how many lanes it occupies, load, brake distance or geo defense distance, OD information. Then a warning message will be composed to send to on-field surrounding driving vehicles along with all special vehicle contents. A following warning decision may be generated whether or not to allow other vehicle switch lane or drive behind or front in certain distances for both surround AV or special vehicle itself in terms of improving driving safety using v2v or v2I communication technology. In certain special situations, disengage AV operation decision may also be required, for examples, for dangerous or poisonous material load vehicles in clement weathers or reduced visibility situations. The special vehicle information package may include attributes for the special vehicle and operating procedures, for example, how to maneuver a vehicle when in the vicinity of the special vehicle.

At Act A350, the location cloud platform 121 generates and transmits warning messages based on the special vehicle information package to one or more connected vehicles 122 within a certain distance of the special vehicle.

A user may interact with the warning or informational messages using an input device 916. The input device 916 may be one or more buttons, keypad, keyboard, mouse, stylus pen, trackball, rocker switch, touch pad, voice recognition circuit, or other device or component for inputting data to the mobile device 122. The input device 916 and display 914 may be combined as a touch screen, which may be capacitive or resistive. The display 914 may be a liquid crystal display (LCD) panel, light emitting diode (LED) screen, thin film transistor screen, or another type of display. The output interface of the display 914 may also include audio capabilities, or speakers. In an embodiment, the input device 916 may involve a device having velocity detecting abilities.

In an embodiment, the connected device 122 may alert or otherwise provide instructions for an autonomous vehicle 124 to perform a maneuver. The autonomous vehicle 124 may include a variety of devices that collect position data as well as other related sensor data for the surroundings of the vehicle 124. The position data may be generated by a global positioning system, a dead reckoning-type system, cellular location system, or combinations of these or other systems, which may be referred to as position circuitry or a position detector. The positioning circuitry may include suitable sensing devices that measure the traveling distance, speed, direction, and so on, of the vehicle 124. The positioning system may also include a receiver and correlation chip to obtain a GPS or GNSS signal. Alternatively, or additionally, the one or more detectors or sensors may include an accelerometer built or embedded into or within the interior of the vehicle 124. The vehicle 124 may include one or more distance data detection device or sensor, such as a LIDAR device. The distance data detection sensor may include a laser range finder that rotates a mirror directing a laser to the surroundings or vicinity of the collection vehicle on a roadway or another collection device on any type of pathway.

A connected vehicle 122 includes a communication device and an environment sensor array for reporting the surroundings of the vehicle 124 to the location cloud platform 121. The connected vehicle 122 may include an integrated communication device coupled with an in-dash navigation system. The connected vehicle 122 may include an ad-hoc communication device such as a mobile device 122 or smartphone in communication with a vehicle system. The communication device connects the vehicle to a network including at least one other vehicle and the location cloud platform 121. The network may be the Internet or connected to the internet.

The sensor array may include one or more sensors configured to detect surroundings of the vehicle 124. The sensor array may include multiple sensors. Example sensors include an optical distance system such as Lidar, an image capture system such as a camera, a sound distance system such as sound navigation and ranging (SONAR), a radio distancing system such as radio detection and ranging (radar) or another sensor. The camera may be a visible spectrum camera, an infrared camera, an ultraviolet camera, or another camera.

In some alternatives, additional sensors may be included in the vehicle 124. An engine sensor may include a throttle sensor that measures a position of a throttle of the engine or a position of an accelerator pedal, a brake senor that measures a position of a braking mechanism or a brake pedal, or a speed sensor that measures a speed of the engine or a speed of the vehicle wheels. Another additional example, vehicle sensor, may include a steering wheel angle sensor, a speedometer sensor, or a tachometer sensor.

A device 122 may be integrated in the vehicle 124, which may include assisted driving vehicles such as autonomous vehicles, highly assisted driving (HAD), and advanced driving assistance systems (ADAS). Any of these assisted driving systems may be incorporated into device 122. Alternatively, an assisted driving device may be included in the vehicle 124. The assisted driving device may include memory, a processor, and systems to communicate with the device 122. The assisted driving vehicles may respond to the lane marking indicators (lane marking type, lane marking intensity, lane marking color, lane marking offset, lane marking width, or other characteristics) received from geographic database 123 and the location cloud platform 121 and driving commands or navigation commands.

The term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, embodiment, the computer-readable medium may include a solid-state memory such as a memory card or other package that houses one or more non-volatile read-only memories. Further, the computer-readable medium may be a random-access memory or other volatile re-writable memory. Additionally, the computer-readable medium may include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations may include distributed processing, component/object distributed processing, and parallel processing. Alternatively, virtual computer system processing may be constructed to implement one or more of the methods or functionalities as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) may be written in any form of programming language, including compiled or interpreted languages, and it may be deployed in any form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in the specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

As used in the application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random-access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a GPS receiver, to name just a few. Computer readable media suitable for storing computer program instructions and data include all forms of non-volatile memory, media, and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The memory may be a non-transitory medium such as a ROM, RAM, flash memory, etc. The processor and the memory may be supplemented by, or incorporated in, special purpose logic circuitry.

To provide for interaction with a user, embodiments of the subject matter described in this specification may be implemented on a device having a display, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments of the subject matter described in this specification may be implemented in a computing system that includes a back end component, e.g., as a data server, or that includes a middleware component, e.g., an application server, or that includes a front end component, e.g., a client computer having a graphical user interface or a Web browser through which a user may interact with an implementation of the subject matter described in this specification, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

The invention claimed is:

1. A system for special vehicle notification, the system comprising:
   one or more connected devices configured to acquire sensor data of a special vehicle;
   one or more machine learning models configured to detect the special vehicle in the sensor data, wherein the one or more machine learning models are configured to classify a type of the special vehicle, identify signage for the special vehicle, and provide the type and signage to a location cloud platform; and
   the location cloud platform configured to acquire special vehicle data from one or more sources including at least the one or more machine learning models or a third party datastore, wherein the location cloud platform is configured to generate a warning message concerning operation in a vicinity of the special vehicle and distribute the warning message to one or more connected vehicles.

2. The system of claim 1, wherein the sensor data comprises at least one of image data, Lidar data, or radar data.

3. The system of claim 1, wherein the location cloud platform is further configured to determine one or more attributes of the special vehicle, wherein the warning message is based on the one or more attributes of the special vehicle.

4. The system of claim 1, wherein the one or more connected vehicles comprise autonomous vehicles.

5. The system of claim 4, wherein the warning message comprises a disengage AV instruction.

6. The system of claim 1, wherein the location cloud platform is configured to map match and track a position of the special vehicle.

7. The system of claim 1, wherein the one or more sources further comprise a traffic flow and incident system.

8. The system of claim 1, wherein the special vehicle comprises a vehicle that is oversized and requires a special operating permit.

9. A method for special vehicle notification, the method comprising:
   acquiring, by one or more connected devices, sensor data of one or more objects on a roadway;
   detecting, by one or more machine learning models, a special vehicle on the roadway at lane level resolution using the sensor data, wherein the special vehicle comprises a vehicle that is oversized and requires a special operating permit and signage;
   determining, by the one or more machine learning models, attributes of the special vehicle, wherein the attributes comprise a type of the special vehicle and signage for the special vehicle;
   generating, by a location cloud platform, a special vehicle information package based on the attributes and a location of the special vehicle; and
   generating and transmitting, by the location cloud platform, warning messages based on the special vehicle information package to one or more connected vehicles within a certain distance of the special vehicle.

10. The method of claim 9, wherein the sensor data comprises image data, Lidar data, or radar data.

11. The method of claim 9, wherein the attributes comprise dimensions of the special vehicle, a type of load, and operating requirements for the special vehicle.

12. The method of claim 9, wherein the warning message comprises an instruction to disengage an AV system of the one or more connected vehicles.

13. The method of claim 9, wherein detecting the special vehicle comprises:
   applying a first machine learned model to the sensor data for vehicle classification;
   applying a second machine learned model to the sensor data for vehicle warning sign detection;
   applying a third machine learned model to the sensor data for vehicle plate and other attribute classification;
   detecting the special vehicle from the vehicle classification, the vehicle warning sign detection, and the vehicle plate and attribute classification.

14. The method of claim 9, wherein detecting the special vehicle further comprises map matching the special vehicle to the lane level on an HD MAP.

15. The method of claim 9, further comprising:
   acquiring third party information about the special vehicle from a governmental database, wherein the special vehicle information package is generated further based on the third party information.

16. A computer-readable, non-transitory medium storing a program that causes a computer to execute a method comprising:
   detecting, by one or more connected devices, a special vehicle driving on a roadway at a lane level resolution using a special vehicle detection machine learning system, wherein detecting comprises:
      applying a first machine learned model of the special vehicle detection machine learning system to the sensor data for vehicle classification;
      applying a second machine learned model of the special vehicle detection machine learning system to the sensor data for vehicle warning sign detection;
      applying a third machine learned model of the special vehicle detection machine learning system to the sensor data for vehicle plate and other attribute classification; and
      detecting, by the special vehicle detection machine learning system, the special vehicle from the vehicle classification, the vehicle warning sign detection, and the vehicle plate and attribute classification;
   acquiring, by a location cloud platform, special vehicle driving data for the detected special vehicle from an additional source;
   generating, by the location cloud platform, driving guidance message based on the special vehicle driving data; and
   transmitting, by the location cloud platform, the driving guidance message to other vehicles in a vicinity of the special vehicle.

17. The computer-readable, non-transitory medium of claim 16, wherein the driving guidance message comprises a disengage AV instruction.

* * * * *